United States Patent

Klein et al.

[11] 4,039,904
[45] Aug. 2, 1977

[54] INTERMEDIATE PRECOAT LAYER OF RESIN MATERIAL FOR STABILIZING ENCAPSULATED ELECTRIC DEVICES

[75] Inventors: Gerhart P. Klein, Manchester; Milton Kallianidis, Brockton, both of Mass.; Paul J. Christiansen, Greencastle; Dennis R. Henderson, Indianapolis, both of Ind.

[73] Assignee: P. R. Mallory & Co., Inc., Indianapolis, Ind.

[21] Appl. No.: 646,406

[22] Filed: Jan. 2, 1976

[51] Int. Cl.² ............... H01G 9/00; H01G 9/16; H01L 23/28
[52] U.S. Cl. .................. 361/433; 174/52 PE; 357/72; 361/301
[58] Field of Search .......... 317/230, 242; 357/72; 29/570; 174/52 PE

[56] References Cited

U.S. PATENT DOCUMENTS

| | | | |
|---|---|---|---|
| 3,364,567 | 1/1968 | Brown et al. | 357/72 |
| 3,439,231 | 4/1969 | Booe | 317/230 |
| 3,486,084 | 12/1969 | Zido | 357/72 |
| 3,749,601 | 7/1973 | Tittle | 357/72 |
| 3,824,328 | 7/1974 | Ting et al. | 357/72 |

*Primary Examiner*—Andrew J. James
*Attorney, Agent, or Firm*—Hoffmann, Meyer & Coles

[57] ABSTRACT

An intermediate precoat layer is provided for encapsulated electrical devices such as solid electrolyte tantalum capacitors. The intermediate precoat layer contains a resin material selected from the group of acrylic, styrene, cellulose acetate, polyvinyl chloride and certain epoxy type materials. The intermediate precoat layer of the present invention helps to stabilize electrical characteristics in the electrical devices such as reducing the DC leakage current in solid electrolyte tantalum capacitors after encapsulation by a protective layer.

11 Claims, 1 Drawing Figure

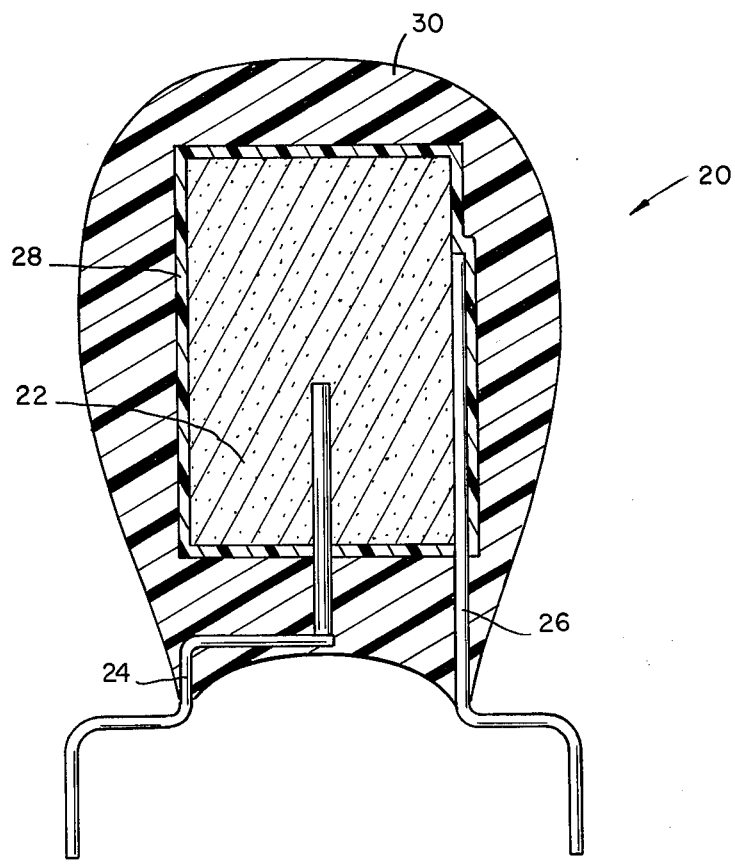

INTERMEDIATE PRECOAT LAYER OF RESIN MATERIAL FOR STABILIZING ENCAPSULATED ELECTRIC DEVICES

The present invention relates to electrical devices and is particularly adaptable to the manufacture of solid electrolyte film-forming metal capacitors.

Although the present invention will generally be discussed throughout this disclosure with reference to its use in the manufacture of solid electrolyte film-forming metal capacitors it should be realized and understood that the means and method of the invention may be adaptable to a wide variety of other electrical devices. The present invention may find use in the manufacture of other electrical devices such as resistors, transistors, controls, and the like.

Solid electrolyte film-forming metal capacitors generally comprise a porous film-forming metal anode body, a dielectric oxide film over the anode body, a conducting layer or layers over the dielectric oxide film forming the cathode for the capacitor, and suitable anode and cathode termination means. The film-formimg metal of the anode body is generally selected from the metals aluminum, titanium, tantalum, niobium or zirconium, preferably tantalum. The conducting layers generally comprise a layer of manganese dioxide next to dielectric oxide film and one or more layers of graphite, solder, silver or other conducting materials.

It is common practice to encapsulate the above type of solid electrolyte capacitor in some type of synthetic resin such as epoxy resin to help protect the capacitor from harmful effects of the environment including moisture and other contaminants and to help protect the capacitor from abusive handling. The encapsulant also provides a smooth, regular appearance for the capacitor. Encapsulation is generally accomplished by dipping, molding or the like. For reasons not entirely understood, the encapsulation step in capacitor manufacture seems to produce a relatively high percentage of rejects, usually due to unacceptably high DC leakage current (DCL) in the capacitors.

This increase in DCL is particularly pronounced with two component liquid epoxy encapsulant systems which are used for dip coating capacitors. It is believed that one or more of the constituents of the liquid epoxy encapsulant system are responsible for the increase in DCL. This effect may be due to some unknown chemical action between the encapsulant resin and the conducting layers over the dielectric oxide film or may be due to mechanical damage cause by the shrinkage of the epoxy coating or thermal effects during the subsequent curing process.

It has been found, however, that many of the capacitor rejects may be brought back to acceptable quality and thus overall yields raised, by storing the capacitors for several weeks at room temperature or by subjecting the capacitors to elevated temperatures while applying a voltage. While both methods of raising the overall yield may be workable, they involve either maintaining large inventories of capacitors or an extra processing step requiring energy for heat and elaborate fixtures to electrically connect the capacitors. Thus the capacitor manufacture industry is desirous of a simple, efficient method which would help eliminate the cause of the high percentage of rejects after capacitor encapsulation.

It is therefore a feature of the present invention to provide a relatively simple, quick, effective and inexpensive method for helping to eliminate the high percentage of rejects due to capacitor encapsulation. Another feature of the present invention is to provide a capacitor having an intermediate precoat layer containing a resin material selected from acrylic, styrene, cellulose acetate, polyvinyl chloride, and certain epoxy type resin materials beneath the encapsulating layer. Yet another feature of the present invention is that the intermediate precoat layer on a capacitor helps to minimize harmful increases in DCL produced during encapsulation. These and various other features of the present invention as well as many specific advantages will become more fully apparent from a detailed consideration of the remainder of this disclosure including the examples and the appended claims in conjunction with the accompanying drawing which is a cross-sectional view of a solid electrolytic film-forming metal capacitor having an intermediate precoat layer containing certain resin materials beneath the encapsulating or protective layer.

Generally, the present invention relates to an electrically insulative intermediate precoat layer adapted for use between a surface of an electrical component means and a protective encapsulant layer, the intermediate layer including a certain resin material or materials selected from the group of acrylic, styrene, cellulose acetate, polyvinyl chloride and certain epoxy type materials; and to an electrical device comprising an electrical component means, the above intermediate precoat layer over the component means and a protective encapsulant layer over the intermediate precoat layer.

More specifically, in one embodiment the present invention relates to an intermediate precoat layer containing a resin material for use on a solid electrolyte film-forming metal capacitor such as a tantalum capacitor and a method for applying the intermediate precoat layer. Examples of appropriate resin materials included acrylic, styrene, cellulose acetate and polyvinyl chloride, and certain epoxy type materials. The resin materials may be characterized as having low linear shrinkage or some degree of compressibility. At present acrylic type materials and certain epoxy type materials are preferred. An example of an inappropriate material for the intermediate precoat layer of the present invention is a polyolefin such as polyethylene or polypropylene. The intermediate precoat layer of the present invention helps to prevent damage to the capacitor during encapsulation.

Referring now to the drawing which illustrates a specific embodiment of the invention, a capacitor 20 including an anode body 22, with appropriate dielectric oxide film and conducting layers (not shown) and anode termination means 24 and cathode termination means 26 is substantially surrounded by intermediate precoat layer 28. Intermediate precoat layer 28 is in turn substantially surrounded by encapsulating or protective layer 30 composed of a thermoplastic or thermosetting resin such as epoxy resin. It should be understood that the thicknesses of protective precoat layer 28 and encapsulating layer 30 relative to the size of the anode body 22 are exaggerated in the drawing for the purposes of clarity.

The resin material of the intermedite precoat layer 28 should meet a number of conditions to be effective and practical for capacitor use. For example, the resin material of the intermediate precoat layer 28 should not cause chemical contamination of the other layers on the capacitor. Preferably, the material should cure or dry quickly at low temperatures and have a low shrinkage coefficient, the material should be inexpensive and easy to handle, and the material should form a good bond with the encapsulant material. The resin material should be capable of being carried or dissolved in a liquid medium for application to the capacitor. Suitable resin materials include acrylic resins, styrene resins, cellulose acetate resins, polyvinyl chloride resins, certain epoxy resins and the like. Mixtures of suitable resins may also be satisfactory.

One presently preferred resin material is an acrylic material. Acrylic material as used herein means a polymeric material made from the monomers acrylic acid, methacrylic acid and their derivatives. The derivatives of these acids include acrylic anhydride, acryloyl chloride, acrylamide, methyl acrylate and other acrylic acid esters, methyl methacrylate and other methacrylate esters. The presently preferred acrylic material is polymethyl methacrylate sold under the trade name Plexiglas by Rohm & Haas Co., Philadelphia, Pa., U.S.A.

As an example, the material for the protective precoat layer of the present invention may be prepared by dissolving an acrylic material in a volative acrylic solvent. As a specific example, the material for the protective precoat layer may be prepared by dissolving polymethyl methacrylate in methylene chloride. The material in the solvent is applied to the capacitors and the solvent volatilized so to form a thin precoat layer of solid acrylic material over the capacitors. The capacitors may then be encapsulated by molding or dipping in a resin.

Another presently preferred resin material is epoxy type molding powder which is a partially polymerized resin commonly known as "B stage" epoxy resin. This type of resin may be dissolved in organic solvents such as ethylene glycol monoethyl ether acetate for application to an electrical component to provide the intermediate precoat layer of the present invention. Alternatively, epoxy type molding powders can be applied to the electrical component by forming a slurry of the powder in a liquid such as water and then evaporating the liquid to provide the intermediate precoat layer.

Other solvents which may be used to provide the intermediate precoat layer of the present invention may be any solvent which appreciably dissolves the resin material to be used and which volatilize at a relatively low temperature. Suitable solvents may include water, methanol, ether, acetone ethylene glycol monoethyl ether, ethyl acetate, chloroform, benzene, methylene chloride hexane, dimethylformamide and lower ketones and alcohols. The presently preferred solvent with polymethyl methacrylate is methylene chloride.

While the resin material may be dissolved in a solvent prior to the application of a capacitor, the present invention also comprehends carrying the resin material in a liquid as a slurry. For example, certain epoxy type resins may be carried in water as a slurry for application to a capacitor.

If solvent is used, the amount of solvent relative to the amount of resin contained therein is not critical to the formation of the intermediate precoat layer of the present invention. Sufficent solvent should be included so as to facilitate application to the capacitor. Large amounts of solvent relative to the amount of resin may require more than one application to obtain the desired thickness of the intermediate precoat layer and may also increase the time necessary for evaporating the solvent. The amount of solvent controls the viscosity of the resin material and thereby determines the thickness of the applied intermedite precoat layer.

The thickness of intermediate precoat layer 28 containing resin material is not thought to be critical, although thin layers of about 0.001 inch to about 0.020 inch in thickness are presently preferred. Thicker layers do not generally provide much greater protection for the capacitor and may adversely affect the size and shape of the finished capacitor.

The protective layer 30 should be composed of a material that is electrically insulative, has good resistance to mechanical shock, is able to withstand elevated temperatures, is relatively impervious to moisture and other contaminants in the atmosphere, is relatively impervious to moisture and other contaminants in the atmosphere, is relatively inexpensive, and is able to be applied to capacitors by techniques such as dipping, molding, brushing, spraying and the like. Examples of such materials are epoxy resins, silicone resins and rubbers, phenoxy resins and phenolic resins.

It is not now entirely known why an intermediate precoat layer containing the subject resin materials helps to reduce damage to the capacitors but based on the previously stated assumption that damage to the capacitor as manifested by increased DCL may be caused by a chemical reaction between the encapsulant and the capacitor conducting layers, it is believed that the intermediate precoat layer of the present invention helps prevent such chemical reactions by providing a type of barrier layer between the conducting layers and the encapsulant layer. Furthermore, the intermedite precoat layer may provide a degree of protection from the potentially harmful temperatures and pressures caused by shrinkage associated with the encapsulation of the capacitors. Whatever the reasons, the use of an intermediate precoat layer containing a resin material or materials of the type described significantly reduces the number of capacitors that have unaccepable electrical characteristics after encapsulation.

Capacitors made according to the present invention and comparative test data for these capacitors are presented in the following examples. It should be understood that the examples are given for the purpose of illustration only and the examples do not limit the invention as has heretofore been described.

EXAMPLE I

Two groups of 6.8 uf/35v solid tantalum capacitors are made, one group having an intermedite precoat layer and the other group having no intermediate precoat layer.

Two stringers of thirty tantalum capacitors each are made under substantially identical processing conditions to yield capacitors having ratings of about 6.9 uf/35v. Half of each stringer of capacitors is dipped in a solution of about 3 wt.% polymethyl methacrylate and about 97 wt.% methylene chloride. After drying at room temperature for about ten minutes, the same capacitors are dipped in the solution again and then dried. Both stringers are then dipped in epoxy resin and cured to complete the encapsulation.

The capacitors of both stringers are tested under voltage for DC leakage current (DCL) after about 30 seconds at an applied voltage of about 35 volts. The results are as follows;

| DCL in μA | | | |
|---|---|---|---|
| Stringer # 1 | | Stringer # 2 | |
| Precoated | Unprecoated | Precoated | Unprecoated |
| 0.10 | 1.36 | 0.07 | 5.58 |
| 0.06 | 0.06 | 0.13 | 2.90 |
| 0.06 | 0.61 | 0.06 | 11.73 |
| 0.52 | 14.86 | 0.13 | 10.94 |
| 0.09 | 0.05 | 0.13 | 11.27 |
| 0.06 | 2.58 | 0.16 | 7.50 |
| 0.05 | 2.93 | 0.07 | 12.38 |
| 0.05 | 3.58 | 0.04 | 11.49 |
| 0.07 | 1.87 | 0.05 | 16.00 |
| 0.25 | 9.64 | 0.07 | 3.25 |
| 0.08 | 9.47 | 0.10 | 3.48 |
| 0.06 | 6.00 | 0.08 | 7.17 |
| 0.09 | 2.84 | 0.05 | 3.89 |
| 0.05 | 6.00 | 0.08 | 5.91 |
| 0.05 | 0.76 | 0.10 | 7.08 |
| Mean | | | |
| 0.11 | 4.17 | 0.09 | 8.04 |

The overall means DCL is about 0.10 uA for the precoated capacitors and about 6.11 uA for the unprecoated capacitors. The median DCL for the overall sample is about 0.07 uA for the precoated capacitors and about 6.00 uA for the unprecoated capacitors.

As the above table indicates, the capacitors having an intermediate precoat layer of the present invention have a generally lower DCL and the DCL distribution is much narrower than for capacitors not having an intermediate precoat layer.

EXAMPLE II

Two groups of 4.8 uf/50v solid tantalum capacitors are made, one group having an intermediate precoat layer and the other group having no intermediate precoat layer.

Four stringers of 15 tantalum capacitors each are made under substantially identical processing conditions to yield capacitors having rating of about 4.8 uf/50v. Eight capacitors of each stringer are dipped in a solution of about 5 wt.% cellulose acetate and about 95 wt.% methyl ethyl ketone and then dried for about ten minutes at room temperature. All the capacitors of both stringers are then dipped in epoxy resin and cured to complete the encapsulation.

The capacitors of all the stringers are tested for DCL after about 30 seconds at about 50 volts. The results are as follows:

| Stringer #1 | | Stringer #2 | | Stringer #3 | | Stringer #4 | |
|---|---|---|---|---|---|---|---|
| Pre | Un | Pre | Un | Pre | Un | Pre | Un |
| 0.05 | 5.68 | 0.82 | 0.62 | 0.18 | 4.64 | 0.39 | 0.18 |
| 0.24 | 9.83 | 0.23 | 1.01 | 0.17 | 2.26 | 0.09 | 1.22 |
| 0.23 | 4.25 | 0.28 | 6.03 | 0.33 | 0.09 | 0.09 | 9.26 |
| 0.13 | 4.70 | 5.05 | 0.32 | 2.29 | 0.36 | 2.25 | 2.25 |
| 0.07 | 2.98 | 0.13 | 8.49 | 0.33 | 2.93 | 0.69 | 5.62 |
| 0.07 | 4.11 | 0.05 | 3.58 | 0.27 | 0.89 | 0.21 | 0.06 |
| 0.15 | 0.09 | 0.15 | 4.70 | 0.43 | 1.47 | 0.19 | 3.05 |
| 0.15 | | 0.02 | | 1.01 | | 0.11 | |
| Mean | | | | | | | |
| 0.14 | 4.52 | 0.26 | 4.22 | 0.38 | 2.08 | 0.27 | 3.10 |

The overall mean DCL for the capacitors tested is about 0.26 uA for the precoated capacitors and is about 3.47 uA for the unprecoated capacitors. The median DCL is about 0.18 uA for the precoated capacitors and about 2.98 uA for the unprecoated capacitors.

Again as the above table indicates, capacitors having an intermediate precoat layer of the present invention have a generally much lower DCL and the DCL distribution is much narrower than the capacitors not having an intermedite precoat layer. Such a lowered DCL and narrower DCL distribution is indicated in both examples typically means an increased yield rate in capacitor manufacture.

EXAMPLE III

Solid tantalum capacitors of the type described above are provided with an intermedite precoat layer which includes styrene resin. The capacitors are dipped in a solution of about 8 wt.% styrene and about 92 wt.% methylene chloride and then allowed to dry. After encapsulation, similar results as reported above are realized.

EXAMPLE IV

A number of solid tantalum capacitors are provided with an intermediate precoat layer containing epoxy type material prior to encapsulation. The intermediate precoat layer is formed by dipping the capacitors in a slurry of about 58 wt.% epoxy molding powder sold by Hysol Division of Dexter Corporation of Olean, N.Y., U.S.A. under the trade-name Hysol XDKF-0196 and about 42 wt.% water. The epoxy molding powder is a linear polymerized resin that has not as yet been cross-linked. Such a resin is commonly known as "B stage" epoxy resin. Water is used to carry the resin so as to minimize the temperature required to volatilized the carrier and to provide the intermediate precoat layer. After drying and final encapsulation, the capacitors are compared with a control group of capacitors containing no intermedite precoat layer by testing for DCL. The group of capacitors having an intermediate precoat layer according to the present invention generally have a significantly lower DCL than those capacitors not having an intermedite precoat layer.

EXAMPLE V

A number of solid tantalum capacitors are provided with an intermediate precoat layer containing epoxy type material prior to encapsulation. The intermediate precoat layer is formed by dipping the capacitors in a slurry of about 63 wt.% epoxy molding powder sold by Fiberite Corp., Winona, Minnesota, U.S.A. under the trade-name Fiberite 3807, about 27 wt.% ethylene glycol monobutyl ether, and about 10 wt.% water. This epoxy molding powder is also a linear polymerized resin that has not as yet been cross-linked. After testing, similar results to those that are obtained in EXAMPLE IV are realized.

EXAMPLE VI

A slurry similar to the one used in Example V is used to provide the intermediate precoat layer for tantalum capacitors. The slurry is about 62.3 wt.% Fiberite 3807, about 26.7 wt.% ethylene glycol monobutyl ether, about 10.5 wt.% water, and about 0.5 wt.% powdered silica sold under the trade name M-5 Cab-o-sil by Godfrey L. Cabot, Inc. of Boston, Mass., U.S.A. Similar results are obtained.

EXAMPLE VII

Solid tantalum capacitors are provided with an intermediate precoat layer as in Example IV except that the solution for forming the layer contains ethylene glycol monomethyl ether. Similar results are obtained.

EXAMPLE VIII

Solid tantalum capacitors are provided with an intermediate precoat layer as in EXAMPLE V except that the solution for forming the layer contains ethylene glycol monoethyl ether acetate instead of ethylene glycol monobutyl ether.

While the present invention has been described with reference to particular embodiments thereof, it will be understood that numerous modifications may be made by those skilled in the art without actually departing from the spirit and scope of the invention as defined in the appended claims.

We claim:

1. An electrically insulative intermediate precoat layer adapted for use between a surface of an electrical component means and a protective coating, the intermediate precoat layer including a resin material selected from acrylic resin, styrene resin, cellulose acetate resin, polyvinyl chloride resin, epoxy "B stage" resin, and mixtures thereof.

2. An electrical device comprising electrical component means, the intermediate precoat layer of claim 1 over the electrical component means and protective layer over the intermediate precoat layer.

3. The electrical device of claim 2 wherein the protective layer includes a synthetic resin and the intermediate precoat layer includes acrylic resin.

4. A capacitor comprising an anode, anode termination means projecting from the anode, cathode means over the anode, cathode termination means projecting from the cathode means, the intermediate precoat layer of claim 1 over the cathode means and a protective layer including a resin over the intermediate precoat layer.

5. The capacitor of claim 4 wherein the anode is composed of tantalum and has a dielectric oxide film, the intermedite precoat layer contains polymethyl methacrylate and the protective coating contains epoxy resin.

6. The capacitor of claim 4 wherein the anode is composed of tantalum and has a dielectric oxide film, the intermedite precoat layer contains epoxy "B stage" resin.

7. In a method of making an electrical device including electrical component means, the steps comprising applying a liquid containing resin material over the electrical component means and volatilizing the liquid to provide the intermediate precoat layer of claim 1 over the electrical component means.

8. In a method of claim 7, wherein the resin material is an acrylic material.

9. In the method of claim 7 wherein the liquid includes water and the resin material is an epoxy "B stage" material.

10. In the method of claim 9 wherein the electrical component means is a solid electrolyte tantalum capacitor.

11. In the method of claim 10 including the step of applying a protective layer over the intermediate precoat layer after volatilizing the solvent.

* * * * *